(12) United States Patent
Dialameh et al.

(10) Patent No.: US 7,050,624 B2
(45) Date of Patent: May 23, 2006

(54) SYSTEM AND METHOD FOR FEATURE LOCATION AND TRACKING IN MULTIPLE DIMENSIONS INCLUDING DEPTH

(75) Inventors: Orang Dialameh, Santa Monica, CA (US); Hartmut Neven, Santa Monica, CA (US)

(73) Assignee: Nevengineering, Inc., Santa Monica, CA (US)

( * ) Notice: Subject to any disclaimer, the term of this patent is extended or adjusted under 35 U.S.C. 154(b) by 366 days.

(21) Appl. No.: 09/915,204

(22) Filed: Jul. 24, 2001

(65) Prior Publication Data

US 2002/0031253 A1    Mar. 14, 2002

Related U.S. Application Data

(63) Continuation-in-part of application No. 09/206,195, filed on Dec. 4, 1998, now Pat. No. 6,301,370.

(60) Provisional application No. 60/220,309, filed on Jul. 24, 2000.

(51) Int. Cl.
*G06K 9/00* (2006.01)

(52) U.S. Cl. ........................ 382/154; 382/103

(58) Field of Classification Search ............... 382/103, 382/115, 118, 154, 181, 190, 209, 276, 240, 382/281; 345/419; 348/169
See application file for complete search history.

(56) References Cited

U.S. PATENT DOCUMENTS

| | | | |
|---|---|---|---|
| 4,725,824 A | 2/1988 | Yoshioka | |
| 4,805,224 A | 2/1989 | Koezuka et al. | |
| 4,827,413 A | 5/1989 | Baldwin et al. | |
| 5,159,647 A | 10/1992 | Burt | |
| 5,168,529 A | 12/1992 | Peregrim et al. | |
| 5,187,574 A | 2/1993 | Kosemura et al. | |
| 5,220,441 A | 6/1993 | Gerstenberger | |
| 5,280,530 A | 1/1994 | Trew et al. | |
| 5,333,165 A | 7/1994 | Sun | |
| 5,383,013 A | 1/1995 | Cox | |
| 5,430,809 A | 7/1995 | Tomitaka | |
| 5,432,712 A | 7/1995 | Chan | |
| 5,511,153 A | 4/1996 | Azarbayejani et al. | |
| 5,533,177 A | 7/1996 | Wirtz et al. | |
| 5,550,928 A | 8/1996 | Lu et al. | |
| 5,581,625 A | 12/1996 | Connell | |
| 5,588,033 A | 12/1996 | Yeung | |
| 5,680,487 A | 10/1997 | Markandey | |
| 5,699,449 A | 12/1997 | Javidi | |
| 5,714,997 A | 2/1998 | Anderson | |

(Continued)

FOREIGN PATENT DOCUMENTS

DE    4406020 C1    6/1995

(Continued)

OTHER PUBLICATIONS

Eriksson, et al. "Towards 3-dimensional face recognition", IEEE, pp. 401-406, Jun. 1999.*

(Continued)

*Primary Examiner*—Daniel Miriam
(74) *Attorney, Agent, or Firm*—Robroy R. Fawcett

(57) ABSTRACT

The present invention is directed to a method and related system for determining a feature location in multiple dimensions including depth. The method includes providing left and right camera images of the feature and locating the feature in the left camera image and in the right camera image using bunch graph matching. The feature location is determined in multiple dimensions including depth based on the feature locations in the left camera image and the right camera image.

16 Claims, 2 Drawing Sheets

U.S. PATENT DOCUMENTS

| | | | |
|---|---|---|---|
| 5,715,325 A | 2/1998 | Bang et al. | |
| 5,719,954 A | 2/1998 | Onda | |
| 5,736,982 A | 4/1998 | Suzuki et al. | |
| 5,764,803 A | 6/1998 | Jacquin et al. | |
| 5,774,591 A | 6/1998 | Black et al. | |
| 5,802,220 A | 9/1998 | Black et al. | |
| 5,809,171 A | 9/1998 | Neff et al. | |
| 5,828,769 A | 10/1998 | Burns | |
| 5,905,568 A * | 5/1999 | McDowell et al. | 356/28 |
| 5,917,937 A | 6/1999 | Szeliski et al. | |
| 5,982,853 A | 11/1999 | Liebermann | |
| 5,995,119 A | 11/1999 | Cosatto et al. | |
| 6,011,562 A | 1/2000 | Gagné | |
| 6,044,168 A | 3/2000 | Tuceryan et al. | |
| 6,052,123 A | 4/2000 | Lection et al. | |
| 6,516,099 B1 * | 2/2003 | Davison et al. | 382/284 |

FOREIGN PATENT DOCUMENTS

| | | |
|---|---|---|
| EP | 0807902 A2 | 11/1997 |
| WO | WO99/53443 | 10/1999 |

OTHER PUBLICATIONS

Foltyniewicz "Automatic Face Recognition via Wavelets and Mathematical Morphology", IEEE, pp. 13-17, 1996.*
Wu, et al "Gabor Wavelets for 3-D Object Recognition", IEEE, pp. 537-542, 1995.*
Wu, et al. "Gabor Wavelet Representation for 3-D Object Recognition", IEEE, pp. 47-64, 1997.*
International Search Report for PCT/US99/07935.
Akimoto, T., et al., "Automatic Creation of Facial 3D Models", IEEE Computer Graphics & Apps., pp. 16-22, Sep. 1993.
Ayache, N. et al., "Rectification of Images for Binocular and Trinocular Stereovision", Proc. Of 9th Int'l., Conference on Pattern Recognition, 1, pp. 11-16, Italy, 1988.
Belhumeur, P., "A Bayesian Approach to Binocular Stereopsis", *Int'l. J. Of Computer Vision*, 19 (3), pp. 237-260, 1996.
Beymer, D. J., "Face Recognition Under Varying Pose", MIT A.I. Lab, Memo No. 1461,pp. 1-13, Dec. 1993.
Beymer, D.J., "Face Recognition Under Varying Pose", MIT A.I. Lab. Research Report, 1994, pp. 756-761.
Buhmann, J. et al., "Distortion Invariant Object Recognition By Matching Hierarchically Labeled Graphs", In Proceedings IJCNN Int'l Conf. Of Neural Networks, Washington, D.C. Jun. 1989, pp. 155-159.
DeCarlo, D., et al., "The integration of Optical Flow and Deformable Models with Applications to Human Face Shape and Motion Estimation", pp. 1-15, In Proc. CVPR '96, pp. 231-238 (published)[TM Sep. 18, 1996].
Devemay, F. et al., "Computing Differential Properties of 3-D Shapes from Steroscopic Images without {3-D} Models", INRIA, RR-2304, pp. 1-28, Sophia, Antipolis, 1994.
Dhond, U., "Structure from Stereo: a Review", IEEE Transactions on Systems, Man, and Cybernetics, 19(6), pp. 1489-1510, 1989.
Fleet, D.J., et al., "Computation of Component Image Velocity from Local Phase Information", *Int., J. Of Computer Vision*, 5:1, pp. 77-104 (1990).
Fleet, D.J., et al. *Measurement of Image Velocity*, Kluwer Academic Press, Boston, pp. 1-203,1992.
Hall, E.L., "Computer Image Processing And Recognition", Academic Press 1979, 99. 468-484.
Hong, H.,et al., "Online Facial Recognition based on Personalized Gallery", Proceedings of Int'l Conference On Automatic Face And Gesture Recognition, pp. 1-6, Japan Apr. 1997.
Kolocsai, P., et al, Statistical Analysis of Gabor-Filter Representation, *Proceedings of International Conference on Automatic Face and Gesture Recognition*, 1997, 4 pp.
Kruger, N., "Visual Learning with a priori Constraints", *Shaker Verlag*, Aachen, Germany, 1998, pp. 1-131.
Kruger, N., et al, "Principles of Cortical Processing Applied to and Motivated by Artificial Object Recognition", Institut fur Neuroinformatik, *Internal Report* 97-17, Oct. 1997, pp. 1-12.
Kruger, N., et al, "Autonomous Learning of Object Representations Utilizing Self-Controlled Movements", 1998, *Proceedings of NN98*, 5 pp.
Kruger, N., et al, "Object Recognition with a Sparse and Autonomously Learned Representation Based on Banana Wavelets", *Internal Report 96-11*, Institut fur Neuroinformatik, Dec. 1996, pp. 1-24.
Kruger, N., et al, "Object Recognition with Banana Wavelets", *European Symposium on Artificial Neural Networks* (ESANN97), 1997, 6 pp.
Kruger, N., "An Algorithm for the Learning of Weights in Discrimination Functions Using *a priori* Constraints", *IEEE Transactions on Pattern Analysis and Machine Intelligence*, vol. 19, No. 7, Jul. 1997, pp. 764-768.
Lades, M., et al, "Distortion Invarient Object Recognition in the Dynamic Link Architecture", *IEEE Transactions on Computers*, vol. 42, No. 3, 1993, 11 pp.
Luong, Q. T., et al, "The Fundamental Matrix, Theory, Algorithm, and Stability Analysis", *INRIA*, 1993, pp. 1-46.
Manjunath, B. S., et al, "A Feature Based Approach to Face Recognition", *In Proceedings IEEE Conference on Computer Vision and Pattern Recognition*, pp. 373-378, Mar. 1992.
Mauer, T., et al, "Single-View Based Recognition of Faces Rotated in Depth", In *Proceedings of the International Workshop on Automatic Face and Gesture Recognition*, pp. 248-253, Zurich, CH, Jun. 26, 1995.
Mauer, T., et al, "Learning Feature Transformations to Recognize Faces Rotated in Depth", In *Proceedings of the International Conference on Artificial Neural Networks*, vol. 1, pp. 353-358, Paris, France, Oct. 9-13, 1995.
Mauer, T., et al, "Tracking and Learning Graphs and Pose on Image Sequences of Faces", *Proceedings of 2nd International Conference on Automatic Face and Gesture Recognition*, Oct. 14-16, 1996, pp. 176-181.
Maybank, S. J., et al, "A Theory of Self-Calibration of a Moving Camera", *International Journal of Computer Vision*, 8(2), pp. 123-151, 1992.
McKenna, S.J., et al, Tracking Facial Feature Points With Gabor Wavelets and Shape Models, (*publication & date unknown*), 6 pp.
Okada, K., et al, "The Bochum/USC Face Recognition System", 19 pp. (*publication & date unknown*).
Okutomi, M., et al, "A Multiple-Baseline Stereo", *IEEE Trans. on Pattern Analysis and Machine Intelligence*, vol. 15, No. 4, pp. 353-363, Apr. 1993.
Peters, G., et al, "Learning Object Representations by Clustering Banana Wavelet Responses", *Tech. Report IR-INI 96-09*, Institut fur Neuroinformatik, Ruhr Universitat, Bochum, 1996, 6 pp.
Phillips, P. J., et al, "The Face Recognition Technology (FERET) Program", *Proceedings of Office of National Drug Control Policy*, CTAC International Technology Symposium, Aug. 18-22, 1997, 10 pages.

Pighin, F, et al, "Synthesizing Realistic Facial Expressions from Photographs", In *SIGGRAPH 98 Conference Proceedings*, pp. 75-84, Jul. 1998.

Roy, S., et al, "A Maximum Flow Formulation of the N-Camera Stereo Correspondence Problem", *IEEE, Proceedings of International Conference on Computer Vision*, Bombay, India, Jan. 1998, pp. 1-6.

Sara, R. et al "3-D Data Acquision and Interpretation for Virtual Reality and Telepresence", *Proceedings IEEE Workshop Computer Vision for Virtual Reality Based Human Communication*, Bombay, Jan. 1998, 7 pp.

Sara, R. et al "Fish-Scales: Representing Fuzzy Manifolds", *Proceedings International Conference Computer Vision, ICCV '98*, pp. 811-817, Bombay, Jan. 1998.

Sara, R., et al, "On Occluding Contour Artifacts in Stereo Vision", *IEEE, Proceedings of International Conference Computer Vision and Pattern Recognition*, Puerto Rico, 1997, 6 pp.

Steffens, J., et al, "PersonSpotter—Fast and Robust System for Human Detection, Tracking, and Recognition", *Proceedings of International Conference on Automatic Face and Gesture Recognition*, 6 pp., Japan—Apr. 1998.

Theimer, W. M., et al, "Phase-Based Binocular Vergence Control and Depth Reconstruction using Active Vision", *CVGIP: Image Understanding*, vol. 60, No. 3, Nov. 1994, pp. 343-358.

Tomasi, C., et al., "Stereo Without Search", *Proceedings of European Conference on Computer Vision*, Cambridge, UK, 1996, 14 pp. (7 sheets).

Triesch, J., et al, "Robust Classification of Hand Postures Against Complex Backgrounds", *Proceedings of the Second International Conference on Automatic Face and Gesture Recognition,* Killington, VT, Oct. 1996, 6 pp.

Turk, M., et al, "Eigenfaces for Recognition", *Journal of Cognitive Neuroscience,* vol. 3, No. 1, pp. 71-86, 1991.

Wiskott, L., et al, "Face Recognition and Gender Determination", *Proceedings of International Workshop on Automatic Face and Gesture Recognition,* pp. 92-97, Zurich CH, Jun. 26, 1995.

Wiskott, L., et al, "Face Recognition by Elastic Bunch Graph Matching", *Internal Report, IR-INI 96-08,* Institut fur Neuroinformatik, Ruhr-Universitat, Bochum, pp. 1-21, Apr. 1996.

Wiskott, L., "Labeled Graphs and Dynamic Link Matching for Face Recognition and Scene Analysis", *Verlag Harr Deutsch,* Thun-Frankfurt am Main. Reihe Physik, Dec. 1995, pp. 1-109.

Wiskott, L., "Phantom Faces for Face Analysis". *Proceedings of 3rd Joint Symposium on Neural Computation,* Pasadena, CA, vol. 6, pp. 46-52, Jun. 1996.

Wiskott, L., "Phantom Faces for Face Analysis". *Internal Report, IR-INI 96-06,* Institut fur Neoroinformatik, Ruhr-Universitat, Bochum, Germany, Apr. 1996, 12 pp.

Wiskott, L. "Phantom Faces for Face Analysis", *Pattern Recognition,* vol. 30, No. 6, pp. 837-846, 1997.

Wiskott, L., et al, "Face Recognition by Elastic Bunch Graph Matching", *IEEE Transactions on Pattern Analysis and Machine Intelligence,* 19(7), pp. 775-779, 1997.

Wong, R., et al, "PC-Based Human Face Recognition System", *IEEE,* pp. 641-644, 1992.

Wurtz, R., "Object Recognition Robust Under Translations, Deformations, and Changes in Background", *IEEE Transactions on Patern Analysis and Machine Intelligence,* vol. 19, No. 7, Jul. 1997, pp. 769-775.

Wurtz, R., et al, "Corner Detection in Color Images by Multiscale Combination of End-stopped Cortical Cells", *Artificial Neural Networks—ICANN '97,* Lecture Notes in Computer Science, vol. 1327, pp. 901-906, Springer-Verlag, 1997.

Yao, Y., et al, "Tracking a Dynamic Set of Feature Points", *IEEE Transactions on Image Processing,* vol. 4, No. 10, Oct., 1995, pp. 1382-1394.

Notification of Transmittal of the International Search Report or the Declaration, International Search Report for PCT/US02/23973, mailed Nov. 18, 2002.

Valente, Stephanie et al., "A Visual Analysis/Synthesis Feedback Loop for Accurate Face Tracking", Signal Processing Image Comunication, Elsevier Science Publishers, vol. 16, No. 6, Feb. 2001, pp. 585-608.

Yang, Tzong Jer, "Face Analysis and Synthesis", Jun. 1, 1999, Retrieved from Internet, http://www.cmlab.csie,ntu.edu.tw/ on Oct. 25, 2002, 2 pg.

Yang, Tzong Jer, "VR-Face: An Operator Assisted Real-Time Face Tracking System", Communication and Multimedia Laboratory, Dept. of Computer Science and Information Engineering, National Taiwan University, Jun. 1999, pp. 1-6.

* cited by examiner

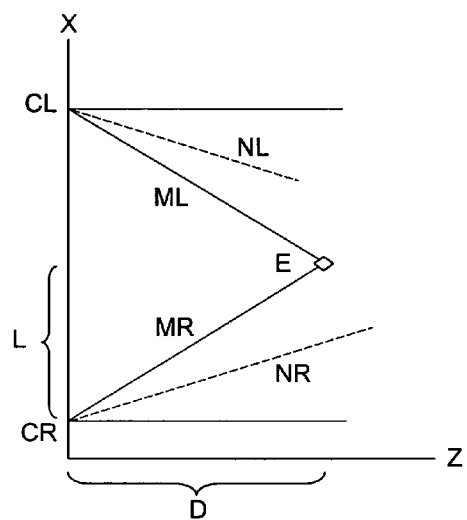
FIG. 3
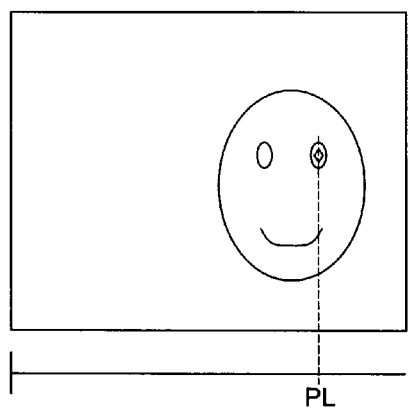 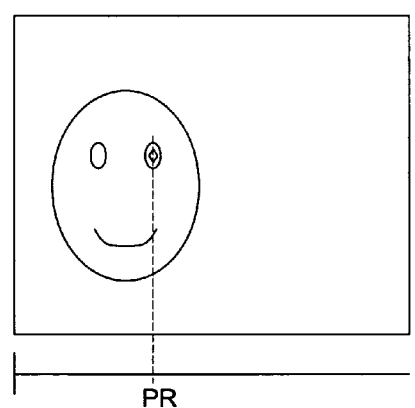
FIG. 4A        FIG. 4B

SYSTEM AND METHOD FOR FEATURE LOCATION AND TRACKING IN MULTIPLE DIMENSIONS INCLUDING DEPTH

CROSS-REFERENCE TO RELATED APPLICATIONS

This application claims priority under 35 U.S.C. §119(e)(1) and 37 C.F.R. § 1.78(a)(4) to U.S. provisional application Ser. No. 60/220,309, entitled SYSTEM AND METHOD FOR FEATURE LOCATION AND TRACKING IN MULTIPLE DIMENSIONS INCLUDING DEPTH and filed Jul. 24, 2000; and claims priority under 35 U.S.C. § 120 and 37 C.F.R. § 1.78(a)(2) as a continuation-in-part to U.S. patent application Ser. No. 09/206,195 which is now U.S. Pat. No. 6,301,370 issued on Oct. 9, 2001, entitled FACE RECOGNITION FROM VIDEO IMAGES and filed Dec. 4, 1998. The entire disclosure of U.S. patent application Ser. No. 09/206,195 which is now U.S. Pat. No. 6,301,370 issued on Oct. 9, 2001 is incorporated herein by reference.

BACKGROUND OF THE INVENTION

The present invention relates to feature tracking techniques, and more particularly, to an eye tracking technique that determines the location of a person's eyes in three-dimensional space.

Virtual reality systems are able to generate three-dimensional images viewed by a person without special glasses using, for example, auto-stereoscopic imaging. Auto-stereoscopic imaging requires real time determination of a viewer's eyes in depth or in three dimensions.

Accordingly, there exists a need for a system and related tools for location of a person's features in three-dimensional space. The present invention satisfies these needs.

SUMMARY OF THE INVENTION

The present invention is directed to a method and related system for determining a feature location in multiple dimensions including depth. The method includes providing left and right camera images of the feature and locating the feature in the left camera image and in the right camera image using bunch graph matching. The feature location is determined in multiple dimensions including depth based on the feature locations in the left camera image and the right camera image.

Other features and advantages of the present invention should be apparent from the following description of the preferred embodiments taken in conjunction with the accompanying drawings, which illustrate, by way of example, the principles of the invention.

BRIEF DESCRIPTION OF THE DRAWINGS

FIG. 3 is a schematic diagram of the geometry of the face and tracking cameras of FIG. 2.

FIG. 4A is an image from a left camera of the face of FIG. 1.

FIG. 4B is an image from a right camera of the face of FIG. 1.

DETAILED DESCRIPTION OF THE PREFERRED EMBODIMENTS

The present invention is directed to a method and related system for determining a feature location in multiple dimensions including depth. The method includes providing left and right camera images of the feature and locating the feature in the left camera image and in the right camera image using bunch graph matching. The feature location is determined in multiple dimensions including depth based on the feature locations in the left camera image and the right camera image.

Figure 1:
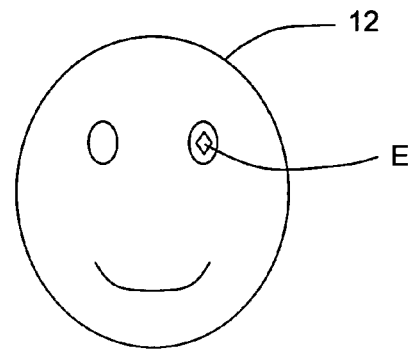
FIG. 1 is an elevation view of a face for feature tracking, according to the present invention.

An embodiment of the invention is described using a simple face image 12 is shown in FIG. 1. The left eye E of the face image is marked with a small diamond to indicate the left eye as a feature for tracking. For simplicity, tracking for only one feature is described. However, several features may be tracked by performing the analysis below for each feature.

Figure 2:
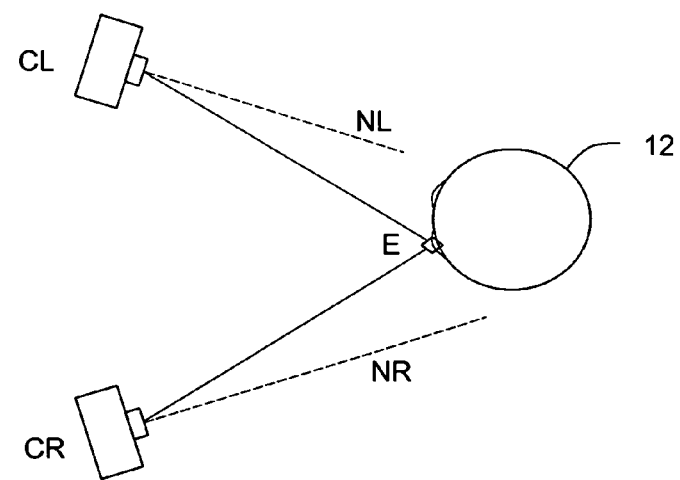
FIG. 2 is a plan view of the face of FIG. 1 with respect to two tracking cameras.

The location and tracking of the left eye may be accomplished using two cameras, a right camera CR and a left camera CL, as shown in FIG. 2. Two cameras are generally required for acquiring the location in multiple dimensions including depth using a simple geometrical model shown in FIG. 3. The coordinate system may be selected such that the cameras lie along an x-axis and the depth from the cameras is measured along a z-axis. The distance to the left eye E along the z-axis is a depth D and the distance along the x-axis is a length L (measured from the location of the right camera CR). A normal ray from each camera, NR and NL, indicates an image ray associated with an approximate center of the cameras imaging area.

The imaging areas of the left and right cameras are shown in FIGS. 4A and 4B, respectively. Each imaging area is a rectangular array of imaging or picture elements (pixels). Each vertical row of pixels in each image area corresponds to a particular slope M for an image ray originating at an origin (based on a pinhole model) of the respective camera.

The cameras may be calibrated for the image ray slope associated with each verticle row of pixels. A feature in the image frame may be located and tracked using elastic bunch graph matching. As shown in FIG. 4A, the left eye E is imaged in the left image along vertical pixel row PL and, as shown in FIG. 4B, the left eye E is imaged in the right image along vertical pixel row PR. The pixel rows PL and PR are associated with slopes ML and MR, respectively. Accordingly, the location of the left eye E is readily calculated in the x-z plane. Elastic bunch graph matching and more sophisticated geometrical models and calibration techniques are described in U.S. patent application Ser. No. 09/206,195 which is now U.S. Pat. No. 6,301,370 issued on Oct. 9, 2001.

In the elastic graph matching technique, an image is transformed into Gabor space using a wavelet transformations based on Gabor wavelets. The transformed image is represented by complex wavelet component values associated with each pixel of the original image.

Although the foregoing discloses the preferred embodiments of the present invention, it is understood that those skilled in the art may make various changes to the preferred embodiments without departing form the scope of the invention. The invention is defined only by the following claims.

We claim:

1. A method for determining a feature location, comprising:
   providing left and right camera images of the feature;
   locating the feature in the left camera image and in the right camera image using bunch graph matching, wherein the feature is an eye of a person's face; and
   determining the feature location in multiple dimensions including depth based on the feature locations in the left camera image and the right camera image.

2. A method for determining a feature location, comprising:
   providing left and right camera images of the feature;
   locating the feature in the left camera image and in the right camera image using image analysis based on wavelet component values generated from wavelet transformations of the camera images, wherein the feature is an eye of a person's face; and
   determining the feature location in multiple dimensions including depth based on the feature locations in the left camera image and the right camera image.

3. A method for determining a feature location as defined in claim 2, wherein the wavelet transformations use Gabor wavelets.

4. Apparatus for determining a feature location, comprising:
   means for providing left and right camera images of the feature;
   means for locating the feature in the left camera image and in the right camera image using image analysis based on wavelet component values generated from wavelet transformations of the camera images, wherein the feature is an eye of a person's face; and
   means for determining the feature location in multiple dimensions including depth based on the feature locations in the left camera image and the right camera image.

5. Apparatus for determining a feature location as defined in claim 4, wherein the wavelet transformations use Gabor wavelets.

6. A method for determining a feature location, comprising:
   providing first and second spaced-apart camera images of the feature;
   locating the feature in the first camera image using image analysis based on wavelet component values generated from wavelet transformations of the first camera image, wherein the feature is an eye of a person's face; and
   locating the feature in the second camera image using image analysis based on wavelet component values generated from wavelet transformations of the second camera image; and
   determining the feature location in multiple dimensions including depth based on the feature location in the first camera image and the feature location in the second camera image.

7. A method for determining a feature location as defined in claim 6, wherein the wavelet transformations use Gabor wavelets.

8. Apparatus for determining a feature location, comprising:
   means for providing left and right camera images of the feature;
   means for locating the feature in the left camera image and in the right camera image using bunch graph matching, wherein the feature is an eye of a person's face; and
   means for determining the feature location in multiple dimensions including depth based on the feature locations in the left camera image and the right camera image.

9. Apparatus for determining a feature location, comprising:
   means for providing first and second spaced-apart camera images of the feature;
   means for locating the feature in the first camera image using image analysis based on wavelet component values generated from wavelet transformations of the first camera image, and locating the feature in the second camera image using image analysis based on wavelet component values generated from wavelet transformations of the second camera image, wherein the feature is an eye of a person's face; and
   means for determining the feature location in multiple dimensions including depth based on the feature location in the first camera image and the feature location in the second camera image.

10. Apparatus for determining a feature location as defined in claim 9, wherein the wavelet transformations use Gabor wavelets.

11. A method for real-time determination of the location of a person's eyes in three-dimensions for auto-stereoscopic imaging, comprising:
    providing left and right spaced-apart camera images of a person's face, the person's face including a left eye and a right eye;
    locating the left eye and the right eye in the left camera image using image analysis based on wavelet component values generated from wavelet transformations of the left camera image, and locating the left eye and the right eye in the right camera image using image analysis based on wavelet component values generated from wavelet transformations of the right camera image; and
    determining the feature locations of the left eye and the right eye in three dimensions based on the left and right eye locations in the left camera image and the left and right eye locations in the right camera image.

12. A method for real-time determination of the location of a person's eyes in three-dimensions for auto-stereoscopic imaging as defined in claim 11, wherein the wavelet transformations use Gabor wavelets.

13. A method for real-time determination of the location of a person's eyes in three-dimensions for auto-stereoscopic imaging as defined in claim 12, wherein the image analysis comprises bunch graph matching.

14. Apparatus for real-time determination of the location of a person's eyes in three-dimensions for auto-stereoscopic imaging, comprising:
    means for providing left and right spaced-apart camera images of a person's face, the person's face including a left eye and a right eye;
    means for locating the left eye and the right eye in the left camera image using image analysis based on wavelet component values generated from wavelet transformations of the left camera image, and locating the left eye and the right eye in the right camera image using image analysis based on wavelet component values generated from wavelet transformations of the right camera image; and
    means for determining the feature locations of the left eye and the right eye in three dimensions based on the left and right eye locations in the left camera image and the left and right eye locations in the right camera image.

15. Apparatus for real-time determination of the location of a person's eyes in three-dimensions for auto-stereoscopic imaging as defined in claim 14, wherein the wavelet transformations use Gabor wavelets.

16. Apparatus for real-time determination of the location of a person's eyes in three-dimensions for auto-stereoscopic imaging as defined in claim 15, wherein the image analysis comprises bunch graph matching.

* * * * *